(12) United States Patent
Uchida et al.

(10) Patent No.: US 11,231,527 B2
(45) Date of Patent: Jan. 25, 2022

(54) DIFFUSER PLATE

(71) Applicant: KURARAY CO., LTD., Kurashiki (JP)

(72) Inventors: Atsushi Uchida, Kamisu (JP); Masaru Karai, Kamisu (JP); Junji Watanabe, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 345 days.

(21) Appl. No.: 15/557,344

(22) PCT Filed: Mar. 10, 2016

(86) PCT No.: PCT/JP2016/001352
§ 371 (c)(1),
(2) Date: Sep. 11, 2017

(87) PCT Pub. No.: WO2016/143350
PCT Pub. Date: Sep. 15, 2016

(65) Prior Publication Data
US 2018/0106930 A1  Apr. 19, 2018

(30) Foreign Application Priority Data

Mar. 12, 2015  (JP) .............................. JP2015-049208

(51) Int. Cl.
*G02B 5/02* (2006.01)
*G02B 3/00* (2006.01)
(Continued)

(52) U.S. Cl.
CPC ............. *G02B 3/0043* (2013.01); *G02B 3/00* (2013.01); *G02B 5/02* (2013.01); *G02B 5/0221* (2013.01);
(Continued)

(58) Field of Classification Search
CPC .... G02B 27/0101; G02B 27/48; G02B 27/00; G02B 27/0012; G02B 27/10;
(Continued)

(56) References Cited

U.S. PATENT DOCUMENTS 7,064,500 B2   6/2006  Victor et al.
2002/0034014 A1  3/2002  Gretton et al.
(Continued)

FOREIGN PATENT DOCUMENTS

CN  106716185 A  5/2017
EP  3 203 277 A1  8/2017
(Continued)

OTHER PUBLICATIONS

Korean Office Action dated Sep. 7, 2018 in Patent Application No. 10-2017-7028658 (with English translation), 9 pages.
(Continued)

*Primary Examiner* — Stephone B Allen
*Assistant Examiner* — Jyotsna V Dabbi
(74) *Attorney, Agent, or Firm* — Oblon, McClelland, Maier & Neustadt, L.L.P.

(57) ABSTRACT

A diffuser plate includes a plurality of fine structures having two or more types of lens functions arranged on a main surface. Intensity of diffused light within a desired diffusion angle range is substantially uniform, and the diffuser plate satisfies a relation of P×P×Sk≤400 [μm²], where P is an average pitch of the plurality of fine structures, Sk is a standard deviation of relative luminance of the plurality of fine structures in their front directions, P≤200 [μm], and Sk≥0.005. Thus, it is possible to provide a diffuser plate having a simple structure capable of achieving optical properties with little luminance and color unevenness and excellent appearance quality when an image is projected.

12 Claims, 13 Drawing Sheets

(51) Int. Cl.
*G02B 27/01* (2006.01)
*G02B 27/48* (2006.01)

(52) U.S. Cl.
CPC ........... *G02B 5/0278* (2013.01); *G02B 27/01* (2013.01); *G02B 27/0101* (2013.01); *G02B 27/48* (2013.01); *G02B 2027/013* (2013.01)

(58) Field of Classification Search
CPC .. G02B 2027/013; G02B 3/0043; G02B 3/00; G02B 3/0006; G02B 3/0037; G02B 3/005; G02B 3/0056; G02B 3/0012; G02B 3/0025; G02B 3/08; G02B 5/02; G02B 5/0221; G02B 5/0278; G02B 5/0284; G02B 5/1871; G02B 5/18; G03B 21/625; G03B 21/602; G03B 21/00; G03B 21/20; G03B 15/02; G03B 13/18; G03B 13/24; Y10S 430/146; H01L 27/14625; H01L 27/14627
USPC ....... 359/599, 618, 619, 620, 621, 626, 707; 430/321, 945; 362/558
See application file for complete search history.

(56) References Cited

U.S. PATENT DOCUMENTS

| | | | |
|---|---|---|---|
| 2002/0034710 A1* | 3/2002 | Morris | G02B 3/0043 430/321 |
| 2003/0076047 A1 | 4/2003 | Victor et al. | |
| 2005/0146795 A1 | 7/2005 | Gretton et al. | |
| 2005/0162104 A1 | 7/2005 | Victor et al. | |
| 2005/0169008 A1 | 8/2005 | Okazaki | |
| 2005/0237615 A1 | 10/2005 | Urey et al. | |
| 2005/0243561 A1* | 11/2005 | Etori | G02B 5/021 362/331 |
| 2012/0147593 A1 | 6/2012 | Yapel et al. | |
| 2015/0293271 A1* | 10/2015 | Miyasaka | H04N 9/3152 353/38 |
| 2015/0355390 A1* | 12/2015 | Katagiri | G02B 5/02 359/599 |
| 2017/0235154 A1 | 8/2017 | Uchida et al. | |

FOREIGN PATENT DOCUMENTS

| | | |
|---|---|---|
| JP | 2000-48613 A | 2/2000 |
| JP | 2004-505306 A | 2/2004 |
| JP | 2007-523369 A | 8/2007 |
| JP | 2010-145745 A | 7/2010 |
| JP | 2012-226300 A | 11/2012 |
| KR | 10-2008-0034045 A | 4/2008 |
| TW | 201116894 A1 | 5/2011 |
| WO | WO 02/10804 | 2/2002 |
| WO | WO 2004/111915 | 12/2004 |
| WO | 2014/104106 A1 | 7/2014 |
| WO | WO-2014103618 A1 * | 7/2014 ............... G02B 5/02 |

OTHER PUBLICATIONS

European Search Report dated Sep. 20, 2018 in Patent Application No. 16761323.1, 10 pages.
Combined Chinese Office Action and Search Report dated May 15, 2019, in Patent Application No. 201680014440.X, 9 pages (with partial unedited computer generated English translation).
Combined Taiwanese Office Action and Search Report dated Jun. 21, 2019, in Patent Application No. 105107478, 10 pages (with English translation).
International Search Report dated Jun. 7, 2016 in PCT/JP2016/001352 filed Mar. 10, 2016.
Urey, Hakan et al., "Microlens-array-based exit-pupil expander for full-color displays," Applied Optics, vol. 44, No. 23, Aug. 2005, pp. 4930-4936.
Office Action in corresponding European Application No. 16761323.1 dated May 7, 2021.

* cited by examiner

EXAMPLE 1 Fig. 9A
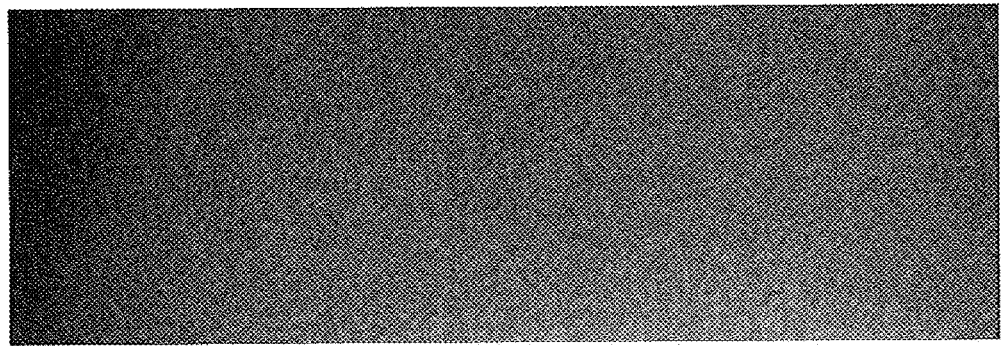
COMPARATIVE EXAMPLE 1 Fig. 9B
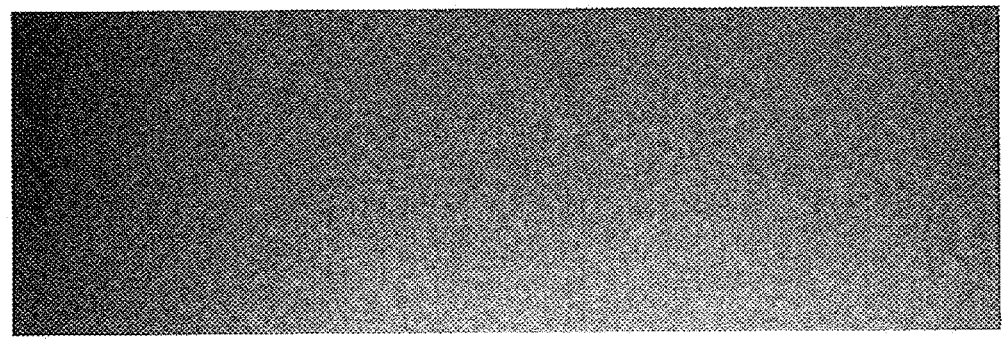
COMPARATIVE EXAMPLE 2 Fig. 9C
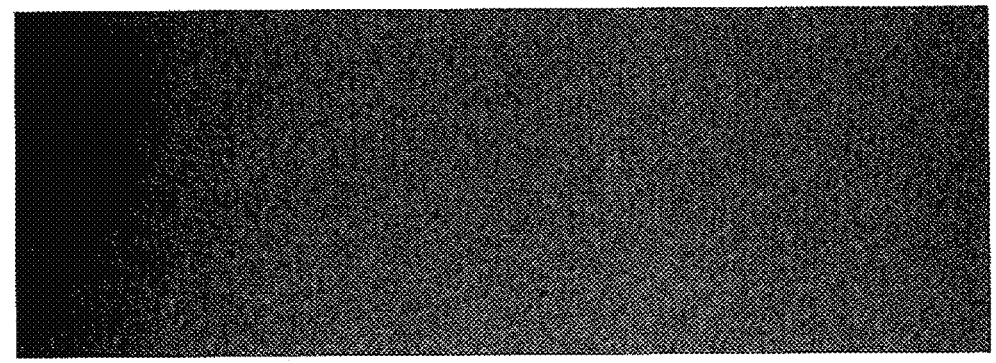

DIFFUSER PLATE

TECHNICAL FIELD

The present disclosure relates to a diffuser plate.

BACKGROUND ART

A diffuser plate using a microlens array is used as a screen for head-up displays and laser projectors. An advantage of using the microlens array is that speckle noise in a laser beam can be reduced more than when a diffuser plate such as a translucent plate or ground glass is used.

Patent Literature 1 discloses an image forming apparatus including a diffuser plate. The diffuser plate uses a laser beam as a light source and includes a laser projector that projects an image formed by an arrangement of a plurality of pixels and a microlens array in which a plurality of microlenses are arranged. When a microlens array is used, incident light can be appropriately diffused, and a necessary diffusion angle can be freely designed.

Patent Literature 2 and 3 and Non Patent Literature 1 disclose a screen using two microlens arrays. When only one microlens array is used, unevenness in luminance and color is likely to occur. Patent Literature 2 and 3 and Non Patent Literature 1 disclose that by using two microlens arrays, such unevenness in luminance can be prevented from occurring.

Patent Literature 3 discloses that one microlens array including microlenses having properties different from each other can prevent unevenness in luminance caused by diffracted light and interference light generated by a periodic structure from occurring.

Patent Literature 4 discloses a method for reducing uneven luminance and uneven color generated by diffraction spots caused by periodicity of fine structures by providing pistons (raised parts) each having a vertical lateral surface in a microlens or by randomly distributing at least one parameter defining a shape or a position of the fine structure in accordance with a predetermined probability density function.

CITATION LIST

Patent Literature

Patent Literature 1: Japanese Unexamined Patent Application Publication No. 2010-145745
Patent Literature 2: Japanese Unexamined Patent Application Publication No. 2012-226300
Patent Literature 3: Published Japanese Translation of PCT International Publication for Patent Application, No. 2007-523369
Patent Literature 4: Published Japanese Translation of PCT International Publication for Patent Application, No. 2004-505306

Non Patent Literature

Non Patent Literature 1: H. Urey and K. D. Powell, "Microlens-array-based exit-pupil expander for full-color displays", APPLIED OPTICS Vol. 44, No. 23, p. 4930-4936

SUMMARY OF INVENTION

Technical Problem

Patent Literature 3 does not describe a specific shape and arrangement of the microlenses for preventing the uneven luminance from occurring. Moreover, for example, if a plurality of parameters such as curvatures and installed positions of the microlenses are randomly distributed at the same time in order to even out the unevenness in color and luminance, when the diffuser plate is used as a screen, there is a problem that, for example, an image will become grainer when it is projected on the screen.

In Patent Literature 4, a plurality of microlenses are raised each in the shape of a piston with a height different from each other on a main surface of the substrate. Further, different phases are given to the respective microlenses to reduce diffracted light and interference light. Then, by using the microlenses having a plurality of radii of curvature, Patent Literature 4 attempts to achieve uniform diffusion properties over the entire diffuser plate. However, when such microlenses are used as a screen, there is a problem that the appearance quality of the image deteriorates such that an image will become grainier when it is projected on the screen.

The present disclosure has been made to solve the above-described problem. The present disclosure aims to provide a diffuser plate having a simple structure capable of achieving optical properties with little luminance and color unevenness and excellent appearance quality when an image is projected.

Solution to Problem

A diffuser plate according to the present disclosure includes a plurality of fine structures having two or more types of lens functions arranged on a main surface, wherein intensity of diffused light within a desired diffusion angle range is substantially uniform, and the diffuser plate satisfies a relation of $P \times P \times Sk \leq 400$ [$\mu m^2$] where P is an average pitch of the plurality of fine structures, Sk is a standard deviation of relative luminance of the plurality of fine structures in their front directions, and $P \leq 200$ [$\mu m$] and $Sk \geq 0.005$.

In the present disclosure, it is preferable that when viewed from inside of a half-value angle at which intensity of diffused light within the desired diffusion angle range becomes half of a maximum value in a diffusion profile with respect to an angle of the diffusion property normalized by the luminance value in the front direction, within a range of angles inside a wider angle between an angle at which an absolute value of a slope of the diffusion property first becomes 0.02 [a.u./deg] or less and an angle range at which the absolute value of the slope of the diffusion property first becomes a local minimum point, a maximum value of the absolute value of the slope of the diffusion property be 0.08 [a.u./deg] or less, and an average value of the absolute value of the slope of the diffusion property be 0.04 [a.u./deg] or less.

In the present disclosure, it is preferable that the plurality of fine structures be microlenses, and shapes of bottom surfaces of the microlenses be polygons.

In the present disclosure, it is preferable that the plurality of fine structures be microlenses, and shapes of bottom surfaces of the microlenses be rectangles or hexagons, and the microlenses be periodically arranged.

In the present disclosure, it is preferable that
the diffuser plate be a transmissive diffuser plate,
the plurality of fine structures be convex shapes, and
the diffuser plate satisfies a relation of $0.2 \leq \Delta H \times (n-1) \times 1000/\lambda$ where $\Delta H$ [$\mu m$] is a difference between a maximum height and a minimum height of the convex shapes of the plurality of fine structures from the main surface to vertexes of the plurality of fine structures, n is a refractive index of the fine structure, and λ [nm] is a wavelength of incident light.

In the present disclosure, it is preferable that
the diffuser plate be a transmissive diffuser plate,
the plurality of fine structures be concave shapes, and
the diffuser plate satisfies a relation of $$0.2 \leq \Delta D \times (n-1) \times 1000/\lambda$$

where ΔD [μm] is a difference between a maximum depth and a minimum depth of the concave shapes of the plurality of fine structures from the main surface, n is a refractive index of the fine structure, and λ [nm] is a wavelength of incident light.

In the present disclosure, it is preferable that
the diffuser plate be a reflective diffuser plate,
the plurality of fine structures be convex shapes, and
the diffuser plate satisfies a relation of $$0.1 \leq \Delta H \times 1000/\lambda$$

where ΔH [μm] is a difference between a maximum height and a minimum height of the convex shapes of the plurality of fine structures from the main surface to vertexes of the plurality of fine structures, and λ [nm] is a wavelength of incident light.

In the present disclosure, it is preferable that
the diffuser plate be a reflective diffuser plate,
the plurality of fine structures be concave shapes, and
the diffuser plate satisfies a relation of $$0.1 \leq \Delta D \times 1000/\lambda$$

where ΔD [μm] is a difference between a maximum depth and a minimum depth of the plurality of fine structures from the main surface, and λ [nm] is a wavelength of incident light.

In the present disclosure, it is preferable that
a plurality of microlenses be arranged on the main surface of the diffuser plate,
shapes of cross sections of the plurality of microlenses perpendicular to the main surface differ from each other and do not have a symmetric axis, and
the diffuser plate satisfies a relation of P×P×Sk≤400 [μm²] where P is an average pitch of the plurality of microlenses, Sk is a standard deviation of relative luminance of the plurality of microlenses in their front directions, and P≤200 [μm] and Sk≥0.005.

Advantageous Effects of Invention

According to the present disclosure, it is possible to provide a diffuser plate having a simple structure capable of achieving optical properties with little luminance and color unevenness and excellent appearance quality when an image is projected.

BRIEF DESCRIPTION OF DRAWINGS

FIG. 9A is a diagram showing a transmission image observation result of a projector using the diffuser plate according to the example 1;

FIG. 9B is a diagram showing a transmission image observation result of a projector using the diffuser plate according to the example 1;

FIG. 9C is a diagram showing a transmission image observation result of a projector using the diffuser plate according to the example 1;

DESCRIPTION OF EMBODIMENTS

First Embodiment

Figure 1:
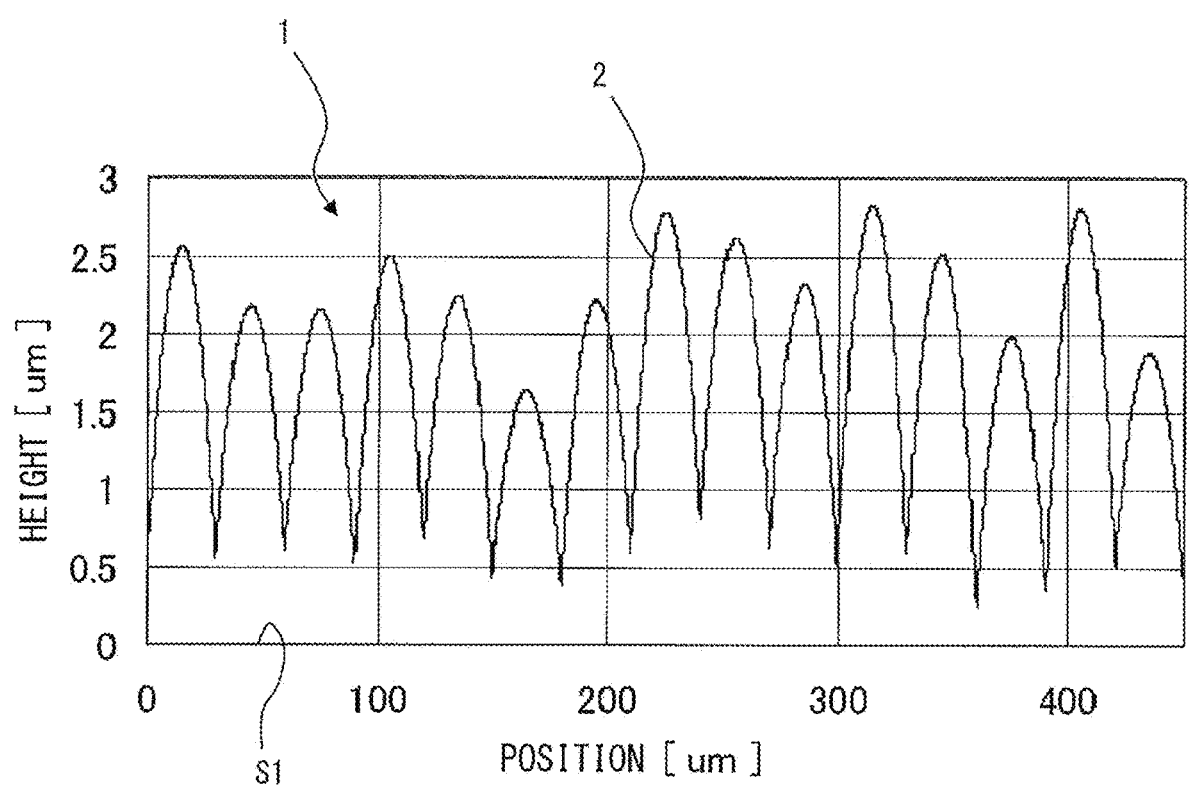
FIG. 1 is a diagram showing a cross-sectional profile of a cross section of a diffuser plate perpendicular to a main surface according to a first embodiment.

Hereinafter, embodiments of the present disclosure will be described with reference to the drawings.
(Shape of Diffuser Plate)
FIG. 1 is a diagram showing a cross-sectional profile of a cross section of a diffuser plate 1 perpendicular to a main surface S1 according to this embodiment. As shown in FIG. 1, the diffuser plate 1 is a light diffuser plate in which a plurality of microlenses 2 are arranged on the main surface S1 of the substrate. The plurality of microlenses 2 are arranged in a lattice pattern on the main surface S1. The vertical axis of FIG. 1 represents the heights of the lenses from the main surface S1 shape when the height of the main surface S1 of the substrate is 0. The horizontal axis of FIG. 1 represents the positions of the lenses in the direction parallel to the main surface S1. Note that an optical axis of the microlens array composed of the plurality of microlenses 2 is oriented in a direction perpendicular to the main surface S1.

As shown in FIG. 1, the cross-sectional shapes of the plurality of microlenses 2 perpendicular to the main surface S1 differ from each other and do not have symmetrical axes. The surface shapes of the plurality of microlenses 2 in the cross sections are formed only of curves. The vertices of the plurality of microlenses 2 differ from each other in their positions in the direction perpendicular to the main surface S1.

Figure 2:
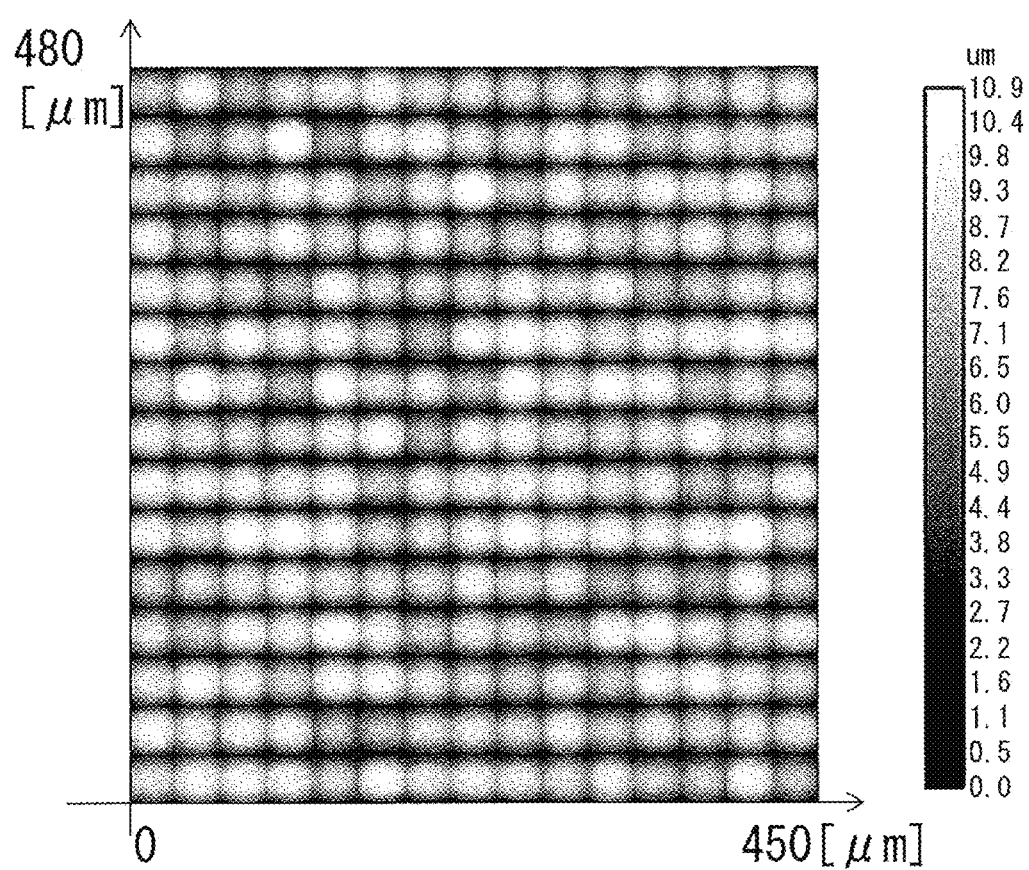
FIG. 2 is a diagram showing a shape of the diffuser plate on the main surface according to the first embodiment.

FIG. 2 shows a microlens array of a unit area of about 450 μm×480 μm. The diffuser plate 1 is formed by spreading this unit area out on the main surface S1 of the substrate. The vertical axis and the horizontal axis in FIG. 2 represent a coordinate on the main surface S1. Further, heights of the microlenses from the main surface S1 are represented by differences in color. In FIG. 2, the closer the color is to black, the closer the microlens is to the main surface S1, whereas the closer the color is to white, the greater the height of the microlens from the main surface S1. As shown in FIG. 2, it is preferable to arrange the plurality of microlenses 2 in a lattice pattern on the main surface S1.

In FIG. 2, the plurality of microlenses 2 are arranged in a rectangular lattice. However, the arrangement of the microlenses 2 is not limited to the rectangular lattice and instead may be a tetragonal lattice, a regular triangular lattice, an oblique lattice, a parallel lattice, or the like. Shapes of bottom surfaces of the plurality of microlenses 2 are not limited to rectangles such as squares or rectangles and instead may be quadrangles, hexagons, or other polygons. It is preferable that the plurality of microlenses 2 be periodically arranged on the main surface S1.

Figure 3:
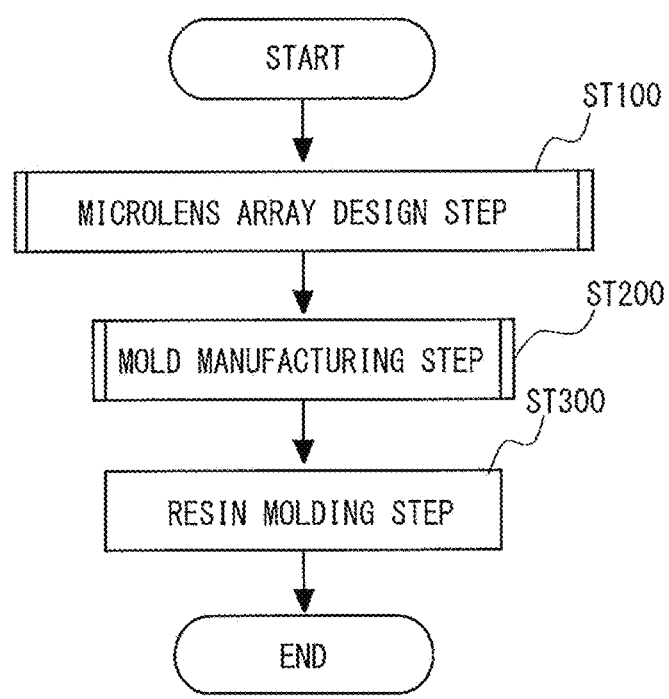
FIG. 3 is a flowchart showing steps of a method for manufacturing the diffuser plate according to the first embodiment.

FIG. 3 is a flowchart showing a procedure of the method for manufacturing the diffuser plate 1. The method for manufacturing the diffuser plate 1 according to this embodiment includes a step (ST100) for designing a microlens array that exhibits a desired light diffusion property, a step (ST200) for manufacturing a mold of the microlens array, and a step (ST300) for transferring a shape of the microlens array to a resin using the mold.

Hereinafter, the steps are described in order.
(Microlens Array Design Step)

Figure 4:
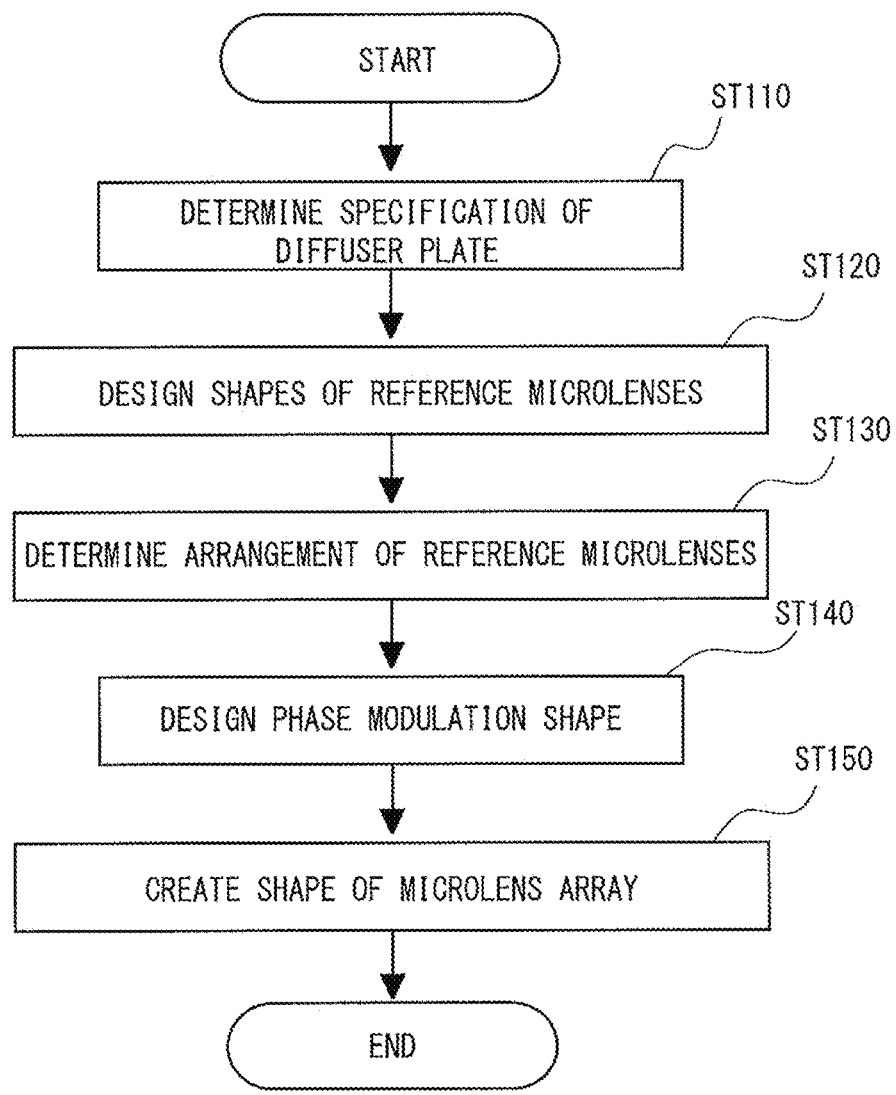
FIG. 4 is a flowchart showing a designing step of a microlens array according to the first embodiment.

The microlens array design step (ST100) in designing the diffuser plate 1 of this embodiment will be described with reference to FIG. 4. In this embodiment, shapes of reference microlenses 3 (FIG. 5) and the phase modulation shape 4 (FIG. 6) that gives a phase difference to the reference microlenses 3 are separately designed.

First, the specifications of the optical properties (in particular, a refractive index) of a material used as the diffuser plate and the wavelength used, and a required diffusion property are determined (ST110).

Figure 5:
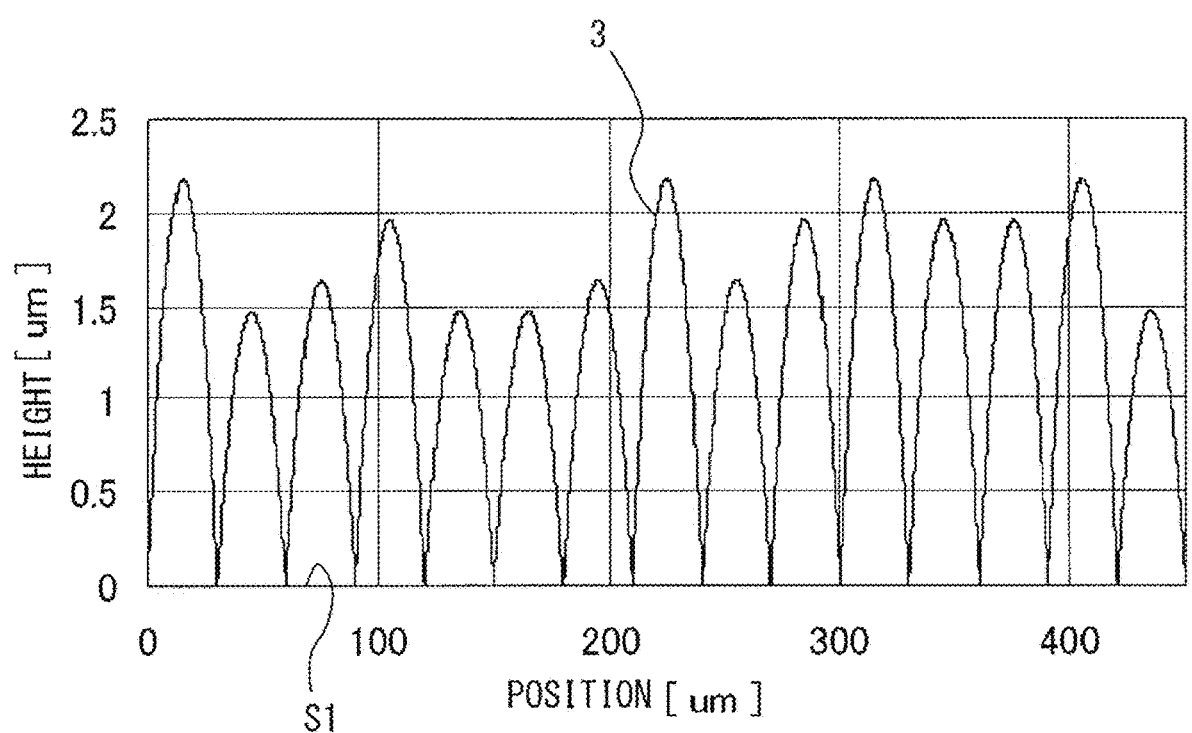
FIG. 5 is a diagram showing a cross-sectional profile of a plurality of reference microlenses according to the first embodiment.

Next, the shapes of the reference microlenses 3 are designed (ST120). The shape of the reference microlens 3 may be a spherical surface or an aspherical surface or may be any other shape as long as it satisfies the specification of the desired diffusion property. Although there may be any number of kinds of the reference microlens 3 used for designing the diffuser plate 1, the number of kinds of the reference microlens 3 is preferably a small number within a range that satisfies necessary properties. FIG. 5 shows a cross-sectional profile of a microlens array in which spherical lenses having four types of curvatures are arranged as an example of the shape of the reference microlens 3.

In the diffuser plate 1, it is better that the plurality of microlenses 2 are closest packed. Thus, the bottom surface of the reference microlens 3 is preferably in a shape that allows closest packing such as a square, rectangular or regular hexagon. However, this shall not apply, for example, when it is desired to give anisotropy to the optical properties of the diffuser plate 1. In such a case, the shape and the aspect ratio of the bottom surface of the reference microlens 3 may be arbitrarily specified.

Next, the arrangement of the reference microlenses 3 is determined (ST130). Specifically, an arrangement pattern and a pitch of the reference microlenses 3 in the unit area on the main surface S1 are determined. As shown in FIG. 5, microlenses having different shapes may be used. Further, as shown in FIG. 2, it is preferable to arrange the reference microlenses 3 in a lattice pattern on the main surface S1.

By periodically repeating the unit area, it is possible to fill the required pattern area. If the unit area is made greater and the unit areas of a plurality of types are randomly arranged, luminance and color unevenness can be effectively reduced. By repeating such unit areas, the amount of data required for processing can be reduced, thereby achieving an effect of reducing a load of data creation. If a processing device has no problem in handling a large volume of data, the data for the entire surface of the microlens array may be prepared at one time.

In the diffuser plate 1 according to this embodiment, the pitch of the microlenses 2 and the degree of variations in the lens properties specified for the microlenses 2 are important. Therefore, it is preferable to design the shape and the pitch of the lenses to satisfy the following conditions. When the pitch exceeds about 200 µm, the pattern can be visually recognized when the microlens array is used as a diffuser plate. Therefore, it is preferable to set the pitch P to be P≤200 µm.

A standard deviation Sk of a relative luminance of the microlenses 2 in the front direction is defined as a parameter representing the property of the microlenses 2 having a plurality of curvatures. The variation (standard deviation) of the relative front luminance of the diffuser plate 1 in the front direction is desirably 0.005≤Sk. Moreover, a product of a square of the pitch P and the standard deviation Sk of the relative front luminance of the microlens 2 is desirably within the range of P×P×Sk≤400 [µm²]. In order to reduce poor appearance (graininess) of the diffuser plate 1, the value of P×P×Sk is preferably small. It is preferable to reduce the value of P×P×Sk within a range where other optical properties such as luminance unevenness are allowable.

In the calculation of the standard deviation Sk of the relative front luminance of the microlenses 2, an area of the fine structure group to be used for the calculation is important, and it is appropriate to set the area near a lower limit of the resolution of the human eye. Therefore, the area of the fine structure group is preferably selected from the range between 0.01 mm² (100 µm square) and 0.36 mm² (600 µm square), more preferably selected from the range between 0.04 mm² (200 µm square) and 0.25 mm² (500 µm square).

By designing the shapes of the microlenses 2 so as to keep the pitch P and the standard deviation Sk of the relative front luminance in the front direction within a certain range, it is possible to achieve a diffuser plate with good appearance quality.

Although the standard deviation of the relative front luminance is described as an example of the parameter indicating the property of the microlens array, it is not necessarily limited to the luminance in the front direction. The parameter may be an angle corresponding to a required viewing angle range.

In addition, although the property of the microlens array is defined in terms of luminance, according to the idea of ray tracing, this is synonymous with the standard deviation of an area of a specific slope angle in each of the microlenses 2. For example, an area of each of the microlenses 2 may be calculated with the slope angle of the microlens 2 contributing to the relative luminance in the front direction being 0 to 0.5 degrees. Any property that is easy to employ may be selected. This area may not only be calculated from the design value but also calculated from the diffuser plate 1 by using a laser microscope or the like.

[Comparison with Related Art]

Various forms of the microlens array can be used as the diffuser plate 1.

For example, as to a diffuser plate composed of a microlens array in which uniform microlenses are repeatedly arranged, when this diffuser plate is irradiated with a laser light source or an LED light source and light transmitted therethrough is observed, diffraction spots corresponding to the pitch are generated. For this reason, light cannot be uniformly diffused, and thus that such a diffuser plate is far from functioning adequately as a diffuser plate.

Further, for example, in a microlens array in which two types of microlenses having different radii of curvature are alternately arranged, the number of the diffraction spots is reduced as compared with a microlens array composed of uniform microlenses. However, there will still be diffraction spots, and thus such a diffuser plate is far from functioning adequately as a diffuser plate.

Thus, in order to reduce the diffraction spots and uneven diffusion caused by diffraction, Patent Literature 4 uses a lens having raised parts or randomly distributes lenses having a plurality of radii of curvature. Such designs introduced to eliminate the diffraction spots enable transmitted light to have uniform diffusion properties macroscopically. However, if the diffused light is visually observed, so-called graininess can be clearly recognized.

For example, calculation for comparison is performed using the design data (radius of curvature) of the microlens array described in FIG. 40 of Patent Literature 4. According to FIG. 40 of Patent Literature 4, the microlenses constituting the microlens array are spherical microlenses each having a bottom surface diameter of 100 μm, and radii of curvature of the spherical surfaces are uniformly distributed within the range of about 100 to 250 μm.

In calculation of the front luminance variation, the number of the lenses is assumed to be 31 (radii of curvature; 100 μm, 105 μm, 110 μm . . . 245 μm, 250 μm). Thus, the standard deviation Sk of the relative front luminance is Sk=0.26. Then, P×P×Sk=100×100×0.26=2600 [μm²]. It can be seen that the design data of the microlens array described in FIG. 40 of Patent Literature 4 exceeds a preferable design range of this embodiment.

In order to reduce the influence of luminance unevenness and diffraction, it is necessary to design in such a way as to disorder the uniformity of the microlens array, for example by arranging microlenses having a plurality of radii of curvature or arranging microlenses randomly. Specifically, when the microlens array is used as a diffuser plate or a screen, the microlens array needs to be made nonuniform, and further, it is necessary to keep the nonuniformity within a certain range in order to have good appearance quality.

Returning to FIG. 4, the description of the microlens array design step (ST100) in the design of the diffuser plate 1 will be continued. After ST130, a phase modulation shape 4 that gives a phase difference is designed (ST140). In the diffuser plate 1 of this embodiment, the phase difference is a representation of a difference in optical path lengths of light transmitted through the microlenses 2 or light reflected on the microlenses 2 normalized with a wavelength. In order to give the phase differences to the plurality of microlenses 2, the phase modulation shape 4 is defined separately from the shapes of the reference microlenses 3. The phase modulation shape 4 can be generated based on, for example, an average pitch, a height difference, and the like. The phase modulation shape 4 may be generated by combining several sine waves.

Figure 6:
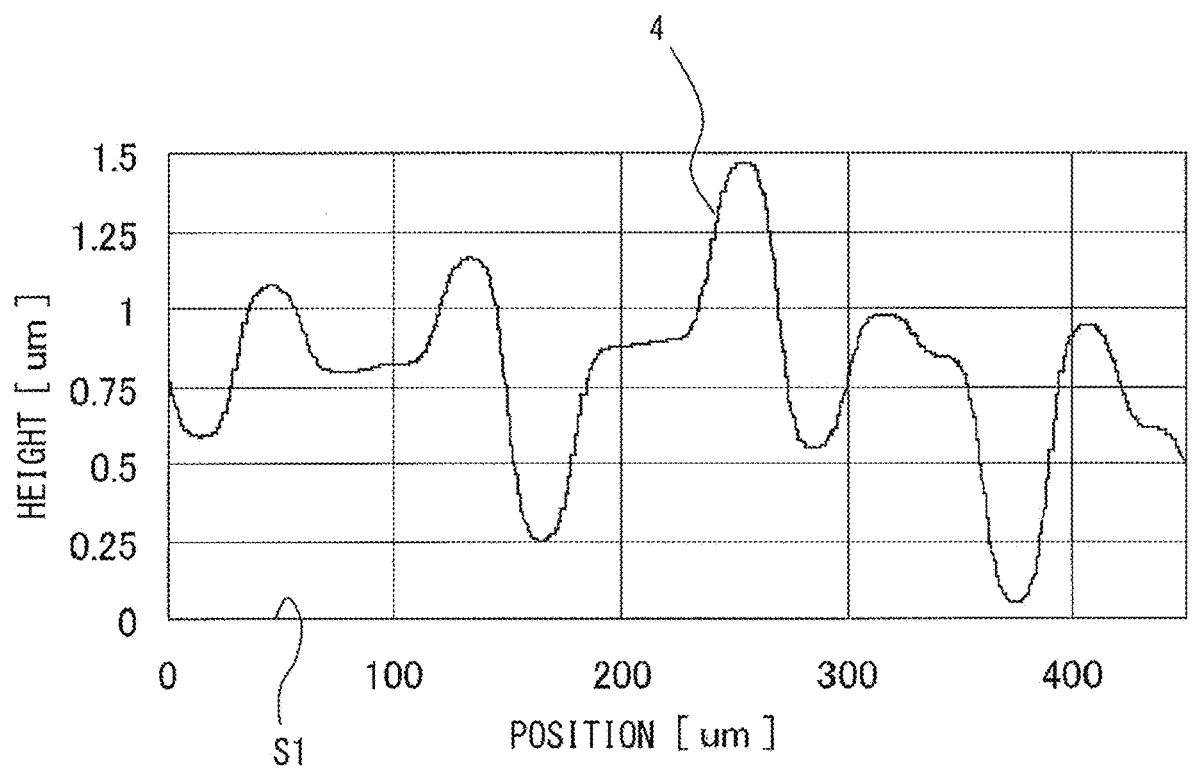
FIG. 6 is a diagram showing a cross-sectional profile of a phase modulation shape according to the first embodiment.

In this embodiment, the phase difference is randomly set for each of the plurality of microlenses 2 using the uniform random numbers within the range of the set phase difference. First, a phase difference represented by one numerical value is set for each of the plurality of microlenses 2. In this state, the phase differences are discontinuous at the boundaries between the respective microlenses 2. Therefore, by averaging the phase differences of all of the plurality of microlenses 2 constituting the microlens array, the phase modulation shape 4 having a three-dimensional curved surface whose phase differences continuously change is created. FIG. 6 shows an example of the shape of the phase modulation shape 4.

Next, the shapes of the plurality of the microlenses 2 are created (ST150). The shapes of the plurality of microlenses 2 of the final microlens array are a combination of the phase modulation shape 4 and the shapes of the plurality of reference microlenses 3. That is, by combing the phase modulation shape 4 shown in FIG. 6 with the shapes of the plurality of the reference microlenses 3 shown in FIG. 5, the microlens array shape as shown in FIG. 1 is created.

In this example, the shapes of the plurality of reference microlenses 3 shown in FIG. 5 are microlenses each having a symmetric axis. On the other hand, the phase modulation shape 4 in FIG. 6 is a continuously changing three-dimensional curved surface without a symmetric axis. Therefore, as shown in FIG. 1, in the cross section of the microlens array perpendicular to the main surface S1, which is obtained by combining the plurality of reference microlenses 3 with the phase modulation shape 4, the cross-sectional shapes of the plurality of microlenses 2 are asymmetrical without a symmetric axis.

That is, the microlenses 2 are characterized by having asymmetric cross sections that are different from each other. However, statistically, there may be the identical lenses by chance. Thus, the above characteristic does not deny that the identical microlenses exist among the plurality of microlenses 2. The characteristic does not also deny arranging the same lenses on purpose. Only a few of the identical microlenses will not cause a significant problem. However, for example, it is not preferable to arrange the identical lenses more than 10% of the number of the plurality of microlenses 2 in the microlens array because the properties such as luminance unevenness are affected.

The optical properties of the diffuser plate 1 using a microlens array having the plurality of microlenses 2 with asymmetric cross sections can be obtained by a wave optics calculation based on the scalar theory. As there are a huge number of combinations of the design of the phase modulation shape 4 and the microlens array, an optimum combination is preferably searched by the means of a computer.

(Phase Difference Between a Plurality of Microlenses)

Next, a transmissive diffuser plate using a microlens array will be described in detail. As shown in FIG. 6, the phase modulation shape 4 is characterized in that its shape is continuously changed. The height difference of the phase modulation shape 4 from the main surface S1 is the phase difference given to the plurality of microlenses 2.

In the diffuser plate 1 of this embodiment, a phase difference is generated in each microlens 2 to thereby reduce luminance and color unevenness caused by diffraction. Assume that the diffuser plate 1 is a transmissive diffuser plate, and the plurality of microlenses 2 are convex lenses. The phase difference in the plurality of microlenses 2 is a combination of the phase modulation shape 4 and the shapes of the reference microlenses 3. A maximum height difference of vertexes of the plurality of microlenses 2 is expressed by ΔH [μm]. The phase difference corresponding to the maximum height difference ΔH is expressed by 1000×ΔH×(n−1)/ν where n is a refractive index of the material constituting the microlens array, and λ [nm] is a wavelength of a light source used.

In order to produce an effect of reducing luminance and color unevenness, it is necessary to set the phase difference in the plurality of microlenses 2 to 0.2 or greater, and more preferably 0.5 or greater. If the light source is composed of a plurality of wavelengths, the longest wavelength among the wavelengths to be used may be used as a representative for the calculation.

That is, when ΔH [μm] is a difference (maximum height difference) between a maximum height and a minimum height of the convex parts of the plurality of microlenses 2 from the main surface S1 the vertexes of the plurality of microlenses 2, n is an refractive index of the microlens 2, and λ [nm] is a wavelength of incident light, preferably, a relation of $$0.2 \leq \Delta H \times (n-1) \times 1000/\lambda$$

is satisfied.
More preferably, a relation of $$0.5 \leq \Delta H \times (n-1) \times 1000/\lambda$$

is satisfied.

Although the transmissive convex lens has been described as an example heretofore, hereinafter, assume that the diffuser plate 1 is a transmissive diffuser plate, and the plurality of microlenses 2 are concave lenses. In the case of the transmissive concave lens, ΔH is replaced by ΔD [μm] that is a difference between a maximum depth and a minimum depth of concave parts of the plurality of microlenses 2 from the main surface S1.

That is, when ΔD [μm] is a difference between the maximum depth and the minimum depth of the vertexes of the concave parts of the plurality of microlenses 2 from the main surface S1, n is an refractive index of the microlens 2, and λ [nm] is a wavelength of incident light, preferably, a relation of $$0.2 \leq \Delta D \times (n-1) \times 1000/\lambda.$$

is satisfied.
More preferably, a relation of $$0.5 \leq \Delta D \times (n-1) \times 1000/\lambda$$

is satisfied.

Hereinafter, assume that the diffuser plate 1 is a reflective diffuser plate, and the plurality of microlenses 2 are convex lenses. In the case of a reflective diffuser plate, as the diffusion pattern formed on the surface does not transmit light, the microlenses are not strictly lenses. However, a lens-like concavo-convex shape shall be referred to as a "microlens" in this specification in order to provide descriptions.

The incident light is reflected on the surface of the microlens array having a distribution at the height of the vertexes of the convex parts of the plurality of microlenses 2, whereby a difference in optical paths occurs, and the phase difference is generated between the plurality of microlenses 2. The phase difference corresponding to the difference ΔH between the maximum height and the minimum height of the convex parts of the plurality of microlenses 2 from the main surface S1 to the vertexes of the microlenses 2 at this time is expressed by 1000×2ΔH/λ.

Like in the transmissive diffuser plate, in order to produce an effect of reducing luminance and color unevenness, it is necessary to set the phase difference in the plurality of microlenses 2 to 0.2 or greater, and more preferably 0.5 or greater.

That is, when ΔH [μm] is a difference between a maximum height and a minimum height of the convex parts of the plurality of microlenses 2 from the main surface S1 to the vertexes of the microlenses 2, and λ [nm] is a wavelength of the incident light, preferably, a relation of $$0.1 \leq \Delta H \times 1000/\lambda$$

is satisfied.
More preferably, a relation of $$0.25 \leq \Delta H \times 1000/\lambda$$

is satisfied.

Hereinafter, assume that the diffuser plate 1 is a reflective diffuser plate, and the plurality of microlenses 2 are concave lenses. In the case of the reflective concave lenses, ΔH is replaced by ΔD that is a difference between a maximum depth and a minimum depth of concave parts of the plurality of microlenses 2 from the main surface S1, in a manner similar to the case when transmissive concave lenses are used.

When ΔD [μm] is a difference between a maximum depth and a minimum depth of the concave parts of the plurality of microlenses 2 from the main surface S1, and λ [nm] is a wavelength of the incident light, preferably, a relation of $$0.1 \leq \Delta D \times 1000/\lambda$$

is satisfied.
More preferably, a relation of $$0.25 \leq \Delta D \times 1000/\lambda$$

is satisfied.

A method for setting the maximum height difference ΔH in the microlens array may be set over the entire pattern area of the microlens array or may be set periodically or randomly with the maximum height difference ΔH defined in a certain unit area.

Many processing methods such as machining, photolithography using a mask, maskless lithography, etching, laser ablation, and the like can be used as a method for processing a microlens array from design data. A mold is manufactured using these techniques, and a resin is molded using the mold to manufacture the diffuser plate 1 including the microlens array. The mold may be used as a direct reflective diffuser plate. The method for molding the diffuser plate 1 may be appropriately selected from a number of molding methods such as roll-to-roll molding, hot press molding, molding using an ultraviolet curable resin, injection molding, and the like. When the microlens array is used as a reflective diffuser plate, a reflective film such as Al may be formed on a surface of lenses having a curvature of the microlens array.

(Mold Manufacturing Process and Molding Process)

Figure 7:
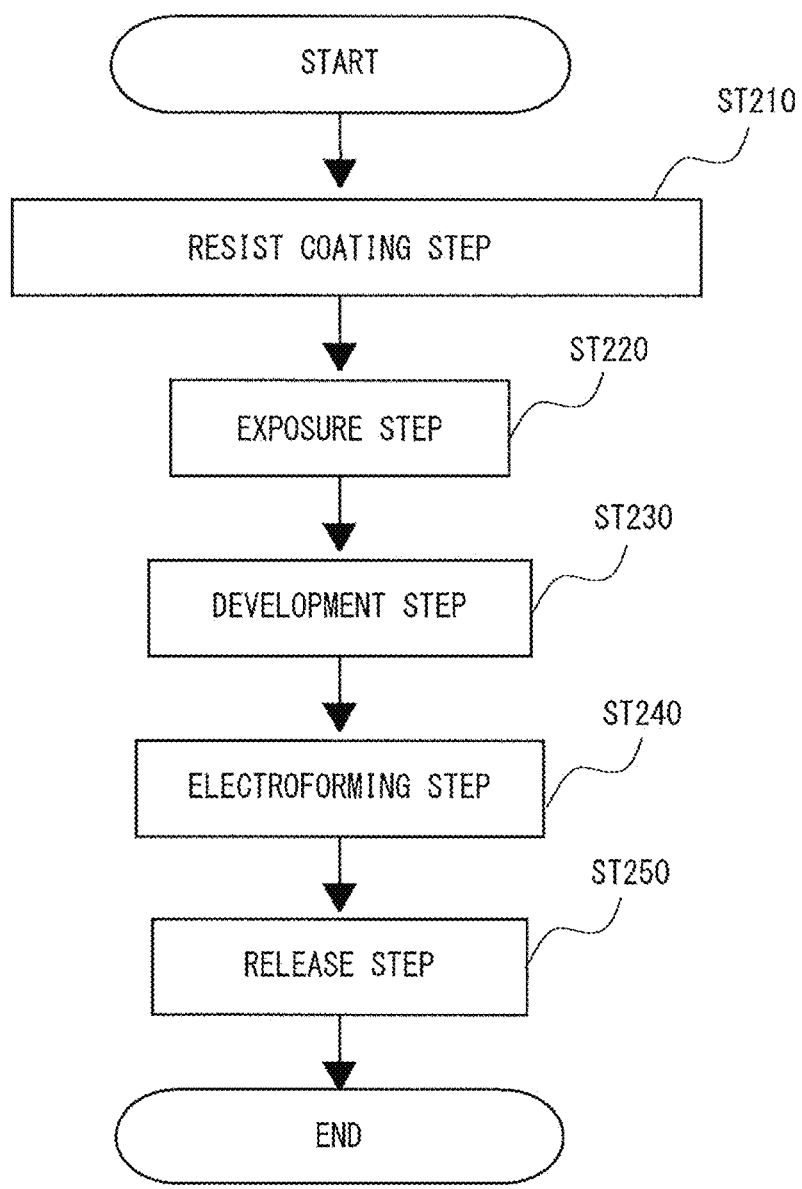
FIG. 7 is a flowchart showing a mold manufacturing process of the diffuser plate according to the first embodiment.

Hereinafter, the mold manufacturing step (ST200) for manufacturing the mold by laser scanning maskless lithography and electroforming, and a resin molding step (ST300) for molding the diffuser plate 1 by using the mold and an ultraviolet curable resin will be described in more detail with reference to FIGS. 3 and 7.

The maskless lithography includes a resist coating step (ST210) for coating a photoresist on a substrate, an exposure step (ST220) for exposing a fine pattern to the photoresist, and a development step (ST230) for developing the exposed photoresist to obtain a master having the fine pattern.

First, in the resist coating step (ST210), a positive photoresist is coated on the substrate. The thickness of the coating film of the photoresist may be equal to or greater than the height of the fine pattern to be formed. The coating film is preferably baked at 70° C. to 110° C.

Next, in the exposure step (ST220), a laser beams is scanned and projected on the photoresist coated in the coating step, thereby exposing the photoresist. The wavelength of the laser beam may be selected according to the type of the photoresist, and may be, for example, 351 nm, 364 nm, 458 nm, 488 nm (oscillation wavelengths of an $Ar^+$ laser), 351 nm, 406 nm, 413 nm (oscillation wavelengths of a $Kr^+$ laser), 352 nm, 442 nm (oscillation wavelengths of an He—Cd laser), 355 nm, 473 nm (pulse oscillation wavelengths of a diode-pumped solid-state laser), 375 nm, 405 nm, 445 nm, 488 nm (a semiconductor laser), and the like.

In the exposure step (ST220) of the microlenses 2, the laser beam is scanned on the resist while modulating the laser power to values determined from the shape of the microlenses 2 and resist sensitivity. The laser beam is focused on an objective lens, so that the laser beam is focused on the resist. The laser spot on the resist is commonly a Gaussian distribution with a finite diameter. Therefore, even if the laser power is changed in a stepwise manner, the quantity distribution of light projected on the resist does not become a stepwise distribution and instead becomes a light quantity distribution having a constant slope. By utilizing such a property of laser exposure, a smooth slope shape can be formed.

In order to increase the phase difference (corresponding to a difference in the lens heights from the main surface S1) between one microlens 2 and the adjacent microlens 2, a difference in the power of the laser projected on the adjacent microlenses 2 may be increased in the exposure step. However, if the difference in the laser power is made too large, there will be more areas of the adjacent microlens 2 near the boundary that deviates from a designed value. Therefore, in order to obtain the same diffusion angle distribution as the optical design result, it is preferable to keep the difference between heights of the one microlens 2 and the adjacent microlens 2 within a certain range.

In this embodiment, the maximum height difference ΔH of the microlens array is the addition of the maximum height difference of the phase modulation shape 4 and the height difference caused by a difference in the shapes of the plurality of reference microlenses 3. If the above-described phase difference normalized with the wavelength is set to one, the average of the phase differences in the plurality of microlenses 2 will become 0.5. Consequently, the plurality of microlenses 2 on the diffuser plate 1 have an average phase difference of ½ wavelength, which is preferable because diffracted light can be reduced.

Next, in the development step (ST230), the exposed photoresist is developed. The development of the photoresist can be carried out by various known methods. There is no particular limitation on a developer solution that can be used. For example, an alkaline developer solution such as tetramethylammonium hydroxide (TMAH) can be used. In the development step (ST230), the photoresist is removed according to the exposure amount, and a fine pattern shape of the photoresist is formed. For example, in the exposure step (ST220), when the exposure is performed with the laser power corresponding to the shapes of concave lenses using a positive resist, a master of the microlenses 2 in which concave lens shapes are formed in the photoresist is obtained.

Next, in the electroforming step (ST240), a metal film is formed, by vapor deposition of nickel metal or the like, on the surface of the photoresist having the fine pattern formed in the exposure step and development step by maskless lithography. Then, the mold is manufactured.

In the electroforming step (ST240), firstly, the surface of the photoresist having the fine pattern is subjected to conductivity treatment by vapor deposition of nickel metal or the like. Next, nickel is deposited into a plate shape on the surface of the nickel deposited film to a desired thickness by electroforming.

Next, in a release step (ST250), the nickel plate formed in the electroforming step (ST240) is released from the photoresist master. Then, a mold (stamper) having convex lens shapes in which concave lens shapes on the photoresist are reversely transferred is obtained. If concave lens shapes are required, the electroforming step may be performed once again.

Next, in the resin molding step (ST300), the resin is molded using the stamper formed in the mold manufacturing step (ST200).

More specifically, firstly, an appropriate amount of, for example, a photocurable resin is applied to the surface of the stamper. Next, a base material is placed on the photocurable resin. Specifically, while the base material is pressed against the photocurable resin with a hand roller and scraping off the extra photocurable resin, the base material is placed on the photocurable resin. Next, ultraviolet light is projected from the base material side to cure the photocurable resin. Note that a material that can transmit light such as ultraviolet light is used as the base material. Next, the base material is released from the stamper. A layer of the photocurable resin is formed on the base material released from the stamper. Further, a structure of the stamper reversely transferred to the layer of the photocurable resin.

When the microlens array is used as the reflective diffuser plate 1, for example, an aluminum reflective film may be vacuum deposited on the surface of the member on which the microlens array is formed, and the incident light may be reflected on the aluminum surface. When the microlens array is formed on only one side of the substrate, the diffuser plate may be configured in such a way that light enters a flat surface of the substrate and reflected on the microlens array surface on which the aluminum reflective film is formed.

Alternatively, the diffuser plate 1 may be configured such that light enters the microlens array surface on which no reflective film is formed and reflected on the flat surface of the substrate on which the reflective film is formed. Further alternatively, the diffuser plate may be configured such that microlens arrays are formed on respective both sides of the substrate, the thickness of the reflective film on the incident side is adjusted to be a half mirror, and the thickness of the reflective film on the rear surface is adjusted so that the reflectance will become approximately 100%. The diffuser plate having two microlens arrays on front and rear surfaces, respectively, may be configured in this way. Further, if necessary, a protective layer may be coated to protect the aluminum reflective film.

In the diffuser plate 1 according to the present disclosure, phase differences are given to the plurality of microlenses 2. By making the phase modulation shape 4 that gives the phase differences into a continuous shape, the plurality of microlenses 2 can be formed into an asymmetric cross section at a cross section perpendicular to the main surface S1 of the substrate with no rotationally symmetric axis like a general lens or a symmetric axis like a toroidal lens.

In the microlens array composed of a plurality of microlenses 2 having asymmetric cross sections, adjacent micro lenses 2 are smoothly connected. By reducing scattered light at connecting parts between the adjacent microlenses 2, the appearance quality of the diffuser plate 1 can be improved. Further, since the phase differences are given to the plurality of microlenses 2, when the pitch of the microlenses 2 is narrowed to several hundreds μm or less, luminance and color unevenness caused by diffraction and interference can be reduced. Accordingly, it is possible to provide a diffuser plate that achieves both optical properties with little luminance and color unevenness and good appearance quality.

EXAMPLES

Hereinafter, the present disclosure will be described in more detail based on examples of the diffuser plate 1 according to this embodiment.

As described above, in the diffuser plate 1 of this embodiment, the microlens array composed of the plurality of microlenses 2 on the main surface S1 was designed by dividing it into the phase modulation shape 4 and the plurality of reference microlenses 3.

The phase modulation shape 4 was configured for the entire microlens array. In the phase modulation shape 4, the maximum height difference from the main surface S1 for giving the phase differences was ΔH=1.5 μm. On the main surface S1, uniform random numbers corresponding to respective positions of the plurality of microlenses 2 were generated to set raised heights (raised parts) for giving the phase differences. However, when different raised heights were set for the plurality of respective microlenses 2, the phase differences in the adjacent microlenses 2 become discontinuous. Thus, the continuous phase modulation shape 4 was generated by performing moving average processing on the raised heights set for the plurality of respective microlenses 2. FIG. 6 shows an extracted part of the phase modulation shape 4 that has been designed.

Next, the shape of the reference microlens 3 will be described. The lens shape of the reference microlens 3 may be a common rotationally symmetric shape. In this case, the cross section of the reference microlens 3 is expressed by the following equation (1). In this equation, C is a curvature [1/μm], K is a constant of the cone, r is a distance from a central axis, and z is a sag amount with reference to the intersection between the center axis and the lens surface. The curvature C is expressed by C=1/R using a radius of curvature R.

[Equation 1]

$$z = \frac{-Cr}{1+\sqrt{1-(K+1)C^2r^2}} \qquad (1)$$

The cross-sectional shape of the reference microlens 3 used in the diffuser plate 1 of this example is expressed by the following equation (2). In this case, the reference microlens 3 is a toroidal lens having a rectangular bottom surface, and curvatures are respectively defined in an X direction and a Y direction. In the equation (2), $r_x$ is a distance from the central axis in the X direction, $r_y$ is a distance from the center axis in the Y direction, $C_x$ is a curvature [1/μn] in the X direction (XZ plane), $C_y$ is a curvature in the Y direction [1/μm], $K_x$ in the (XZ plane) is a constant of the cone in the X direction (XZ plane), and $K_y$ is a constant of the cone in the Y direction (YZ plane).

[Equation 2]

$$z = \frac{-C_x r_x}{1+\sqrt{1-(K_x+1)C_x^2 r_x^2}} + \frac{-C_y r_y}{1+\sqrt{1-(K_y+1)C_y^2 r_y^2}} \qquad (2)$$

In the diffuser plate 1 according to this example, the pitch of the plurality of microlenses 2 was fixed at Px=30 μm and Py=32 μm. The reference microlenses 3 had four kinds of radii of curvature in the X direction and three kinds of radii of curvature in the Y direction. In the diffuser plate 1 according to this example, a total of twelve kinds of the reference microlenses 3, which are a combination of radii of curvature in the X direction and the Y direction, were randomly selected using uniform random numbers and then arranged on the main surface S1.

For the reference microlenses 3, the radii of curvature $R_x$ [μm] in the X direction were $R_x$ [μm]=62.8, 64.0, 61.9, and 63.9 with the spherical lenses ($K_x$=0). The radii of curvature $R_y$[μm] in the Y direction were $R_y$ [μm]=29.0, 31.5, and 28.0 with aspherical lenses ($K_y$=−0.45). Further, all the reference microlenses 3 use the height of the lowest part as the reference height.

As a property of the microlens array of the diffuser plate 1 according to this embodiment, the standard deviation (Sk) of the relative front luminance of the plurality of microlenses 2 is simply defined as follows using the concept of ray tracing.

Since a lens shape Z is a sum of the cross-sectional shapes in the X and Y directions, it is expressed by the following equation (3) as in the equation (2).

$$Z(rx,ry)=Zx(rx)+Zy(ry) \qquad (3)$$

Here, when a certain microlens 2 is focused, a cross-sectional shape Zx in the X direction and an inclination slope dZx/dx are expressed by the following equations (4) and (5).

$$Zx(rx)=-Cx\times rx^2/(1+\text{sqrt}(1-(Kx+1)\times Cx^2\times rx^2)) \qquad (4)$$

$$dZx(rx)/dx=-Cx\times rx/\text{sqrt}(1-(Kx+1)\times Cx^2\times rx^2) \qquad (5)$$

When a value of a slope angle θ [deg] that contributes to the front direction is defined and its slope is Ax, the slope Ax can be expressed as follows.

$$Ax=\tan\theta=dZx(rx)/dx \qquad (6)$$

Next, a position Rx of the slope angle θ deg in the X direction cross section is expressed by the following equation (7) where rx=Rx from the equations (5) and (6).

$$Rx=Ax/(Cx\times\text{sqrt}(1+Ax^2\times(1+Kx))) \qquad (7)$$

Likewise, Ry is calculated, and an area S of the slope angle from 0 to θ deg can be calculated by the following equation (8).

$$S=Rx\times Ry \qquad (8)$$

According to the idea of ray tracing, as the area S is proportional to the luminance, the front luminance I of the lens is I=αS (α is an arbitrary coefficient).

If the front luminance of each of one to n lenses handled in the microlens array design is $I_1$ to $I_n$, the relative front luminance $i_n$ [%] with respect to the average front luminance in each lens is calculated using the average value $\text{Avg}(I_1$ to $I_n)$ of $I_n$ by the following equation (9).

$$i_n=I_n/\text{Avg}(I_1 \text{ to } I_n) \qquad (9)$$

From the relative front luminance $i_n$ of each lens, the standard deviation Sk of the relative front luminance in the microlens array is defined by the following equation (10).

$$Sk = \text{stdev}(i_1 \text{ to } i_n) \quad (10)$$

In this example, the lens slope surface angle that contributes to front direction luminance was θ=0.5 [degree]. In the optical design described above, Sk=0.051 in the calculation area of about 0.23 μm² (480 μm square, the number of lenses: 16×15=240; Px=30 μm, Py=32 μm). Thus, P×P×Sk=30×32×0.051≈49 [μm²].

The shapes of the plurality of microlenses 2 of the microlens array is the combination of the shape of the phase modulation shape 4 and the plurality of reference microlenses 3. The shape of the plurality of microlenses 2 constituting the microlens array is a obtained by superimposing the reference microlenses 3 having a plurality of symmetrical axes and the phase modulation shape 4 with no symmetric axis or symmetrical point. Therefore, each of the plurality of microlenses 2 constituting the microlens array has an asymmetrical cross section.

Figure 8:
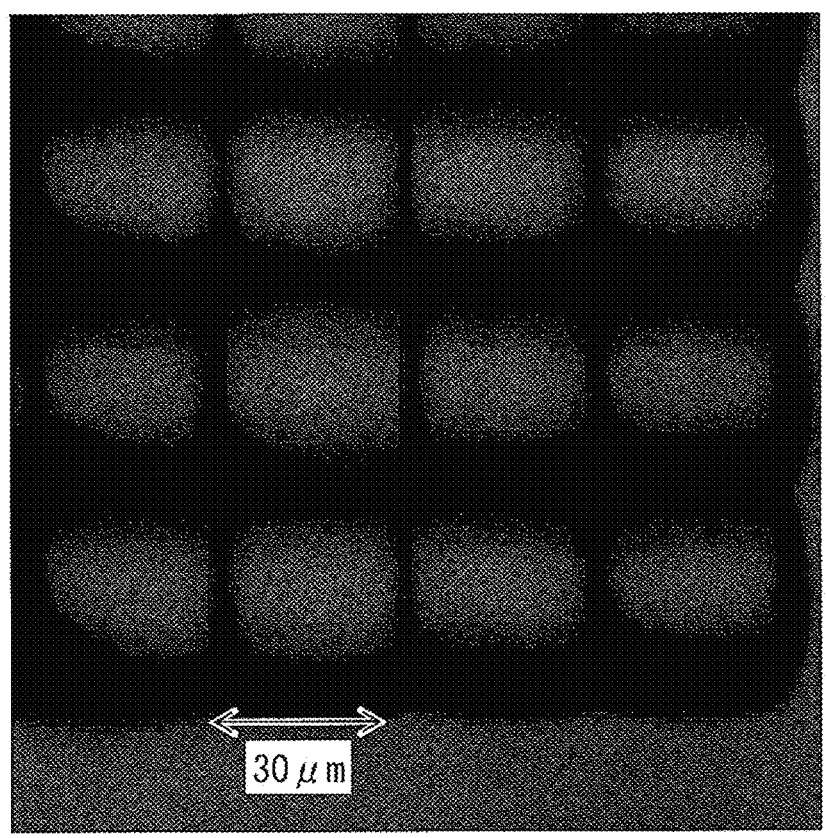
FIG. 8 is a diagram showing a laser microscope observation image of a stamper used for manufacturing a diffuser plate according to an example 1.

The entire microlens array area of about 60 nm×80 mm on the surface of the diffuser plate 1 was designed based on the above-mentioned contents (ST100). Using this design data, a stamper on which a microlens array shape having a plurality of convex lenses was obtained through the mold manufacturing step (ST200). FIG. 8 shows an observation image of the lens shape of this stamper captured by a confocal laser microscope. In FIG. 8, it can be seen that a plurality of convex lens shapes provided with phase differences are formed.

Next, using the stamper shown in FIG. 8, molding was performed using a photocurable resin. Using a polycarbonate film having a thickness of 0.3 mm as a base material, an acrylic photocurable resin having a refractive index of 1.52 was poured between the stamper and the base material to perform the molding. Then, the diffuser plate 1 is manufactured.

FIGS. 9A to 9C are diagrams showing results of projecting, by a projector using an LED light source, a white image on the diffuser plate 1 according to this example obtained by the molding, and an image obtained by reflecting the transmitted light on a concave mirror is reflected again on the glass surface, and then capturing the image by a digital camera. FIG. 9A shows a result of projecting an image on the diffuser plate 1 according to this example.

FIG. 9B is a result of projecting an image on the diffuser plate according to a comparative example 1. The diffuser plate according to the comparative example 1 was designed using the same designing method as in this example. In the diffuser plate according to the comparative example 1, in the X direction, the pitch was 30 μm and the radii of curvature $R_x$ [μm] were 52.9, 58.5, 69.8, and 77.4 with spherical lenses ($K_x$=0), while in the Y direction, the pitch was 32 μm, the radii of curvature $R_y$ [μm] were 28.2, 31.2, and 34.6 with aspherical lenses ($K_y$=−0.45). The standard deviation of the relative front luminance of the microlens array was Sk=0.178 and P×P×Sk≈171 [μm²].

FIG. 9C shows a result of projecting an image on a diffuser plate according to a comparative example 2. The diffuser plate according to the comparative example 2 was designed using the same designing method as in this example. In the diffuser plate according to the comparative example 2, in the X direction, the pitch was 60 μm and the radii of curvature $R_x$ [μm] were 135.3, 170.8, 162.5, and 136.2 with spherical lenses ($K_x$=0), while in the Y direction, the pitch was 60 μm, the radii of curvature $R_y$ [μm] were 58.5, 57.9, and 65.8 with aspherical lenses ($K_y$=−0.45). The standard deviation of the relative front luminance of the microlens array was Sk=0.131 and P×P×Sk≈472 [μm²] (calculated value with 64 lenses in total).

From the above results, the smaller the value of P×P×Sk, the less the graininess of the image and the better the image quality. On the other hand, when the value of P×P×Sk exceeds 400 [μm²], the image will be strongly grainy, and thus the microlens array cannot be used as a diffuser plate or a screen that requires high appearance quality.

[Addition of Conditions for Uniform Diffusion Properties]

Diffusion properties were measured using a luminance meter (BM-7 manufactured by Topcon Technohouse Co., Ltd.), a gonio stage, and a white LED parallel light source (LTCL 23 manufactured by Opto Engineering).

Firstly, a light source was installed on the gonio stage, and the luminance meter is disposed to face the light source at a position 500 mm away therefrom. Then, the diffuser plate was installed at a position 10 mm away from the light source, and the diffusion properties (luminance value at each angle) were measured. The light from the light source was made incident perpendicular on the pattern surface of the diffuser plate. Further, the measurement angle of the luminance meter was set to 0.2 degrees, and the gonio stage was moved in increments of 1 degree to perform measurement within a required angle range. This time, the measurement was carried out within the range of ±30 degrees.

Figure 10:
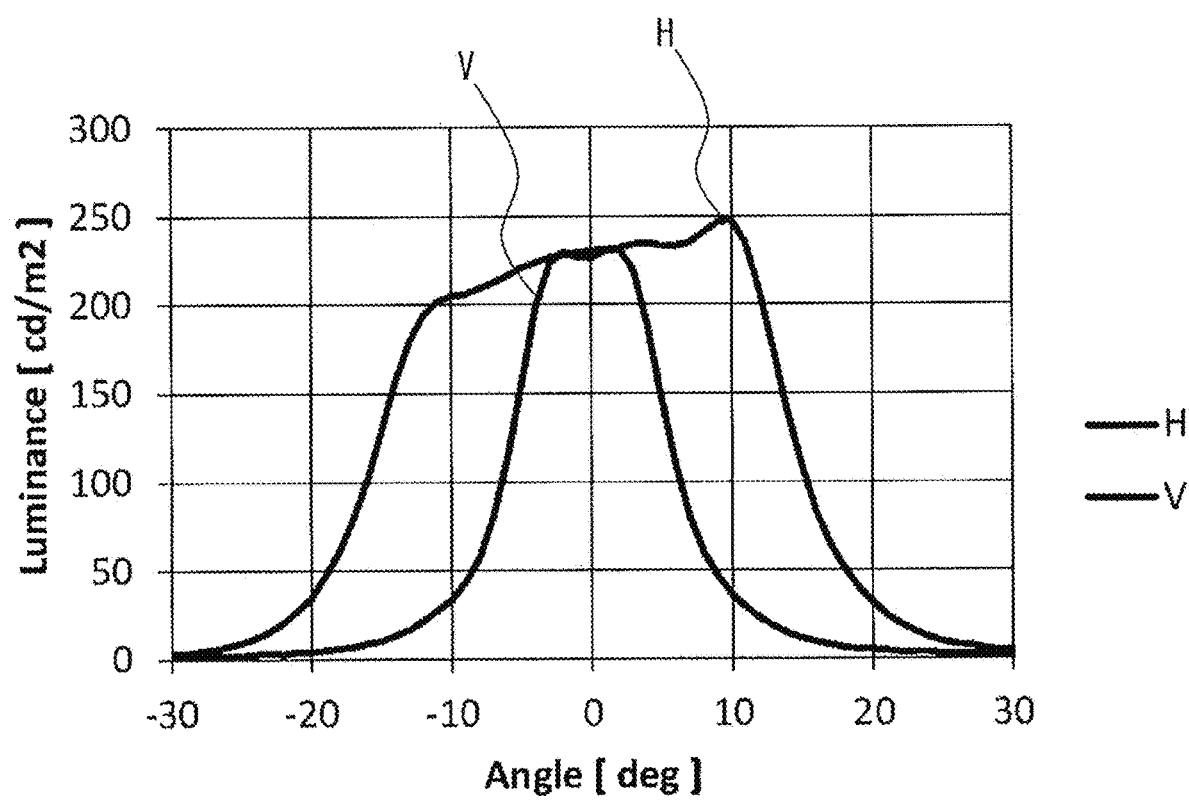
FIG. 10 is a diagram showing diffusion an angle distribution property of the diffuser plate according to the example 1.
Figure 11:
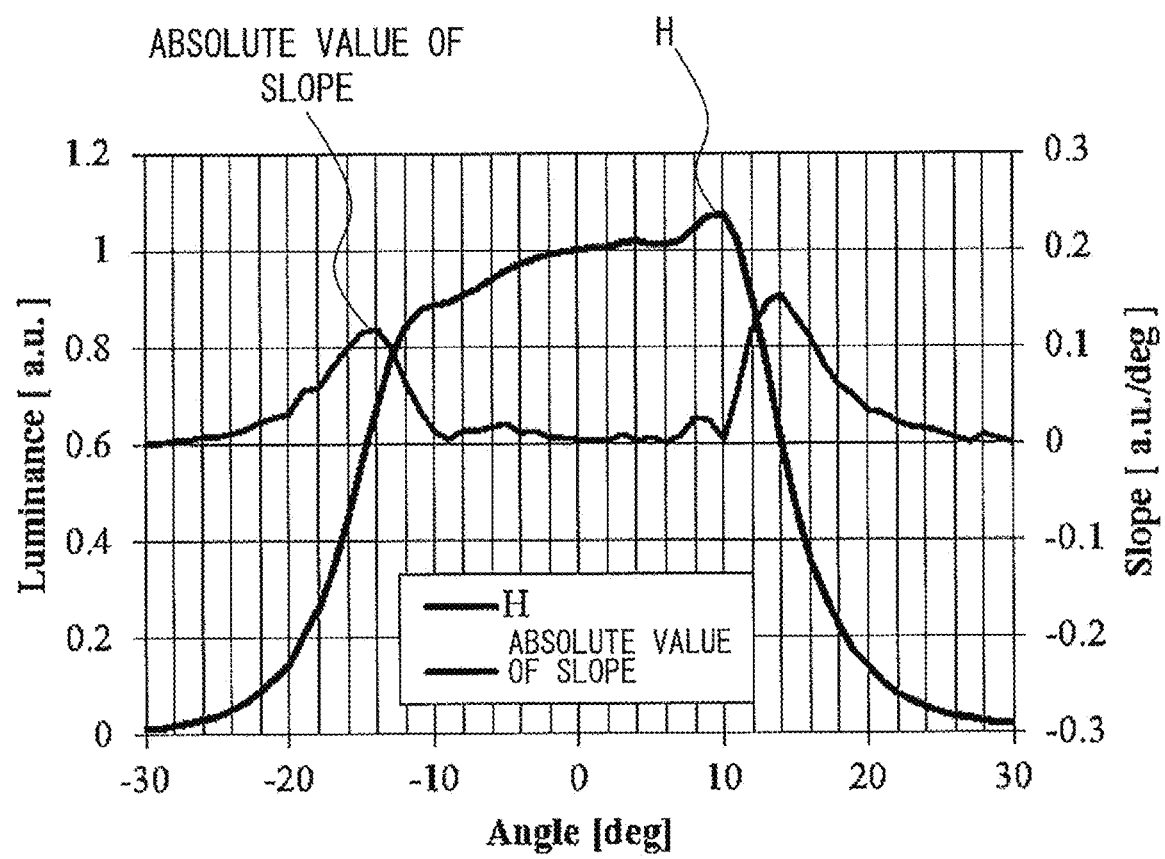
FIG. 11 is a diagram showing a diffusion angle distribution of the diffuser plate according to the example 1 and an absolute value of a slope thereof.

FIG. 10 shows the measurement results of the diffusion property of the diffuser plate 1 according to this example. In FIG. 10, an H direction represents the horizontal direction of the diffuser plate 1, and a V direction represents the vertical direction of the diffuser plate 1. FIG. 11 shows a profile that has a wide full width at half maximum in the H direction which is normalized using the value of the front luminance, and then an absolute value of a slope of the normalized profile in the H direction is calculated.

Next, for the diffusion property normalized with the luminance value in the front direction shown in FIG. 11, a maximum value and an average value of an absolute value of a slope of the diffusion property are calculated within a range of angles between an angle inside an angle at which the absolute value of the slope of the diffusion property becomes maximum and an angle at which the absolute value of the slope of the diffusion property first becomes 0.02 [a.u./deg] or less or the absolute value of the slope of the diffusion property approaches 0, i.e., a local minimum point. In this example, the maximum value of the absolute value of the slope of the diffusion property was 0.026 [a.u./deg], and the average value of the absolute value of the slope of the diffusion property within this range was 0.0010 [a.u./deg]. It can be seen that the diffusion property is sufficiently uniform and the graininess indicating the appearance quality is reduced.

Comparative Example with Related Art

Next, the uniformity of the diffusion property according to the related art was also measured. First, a stamper including a microlens array was manufactured. In the microlens array, microlenses were closest packed (with no space between the lenses). A bottom surface of each of the microlenses was a regular hexagon, a lens width was 20 μm (the longest diagonal was 23 μm), and a radius of curvature was about 20 μm.

Figure 12:
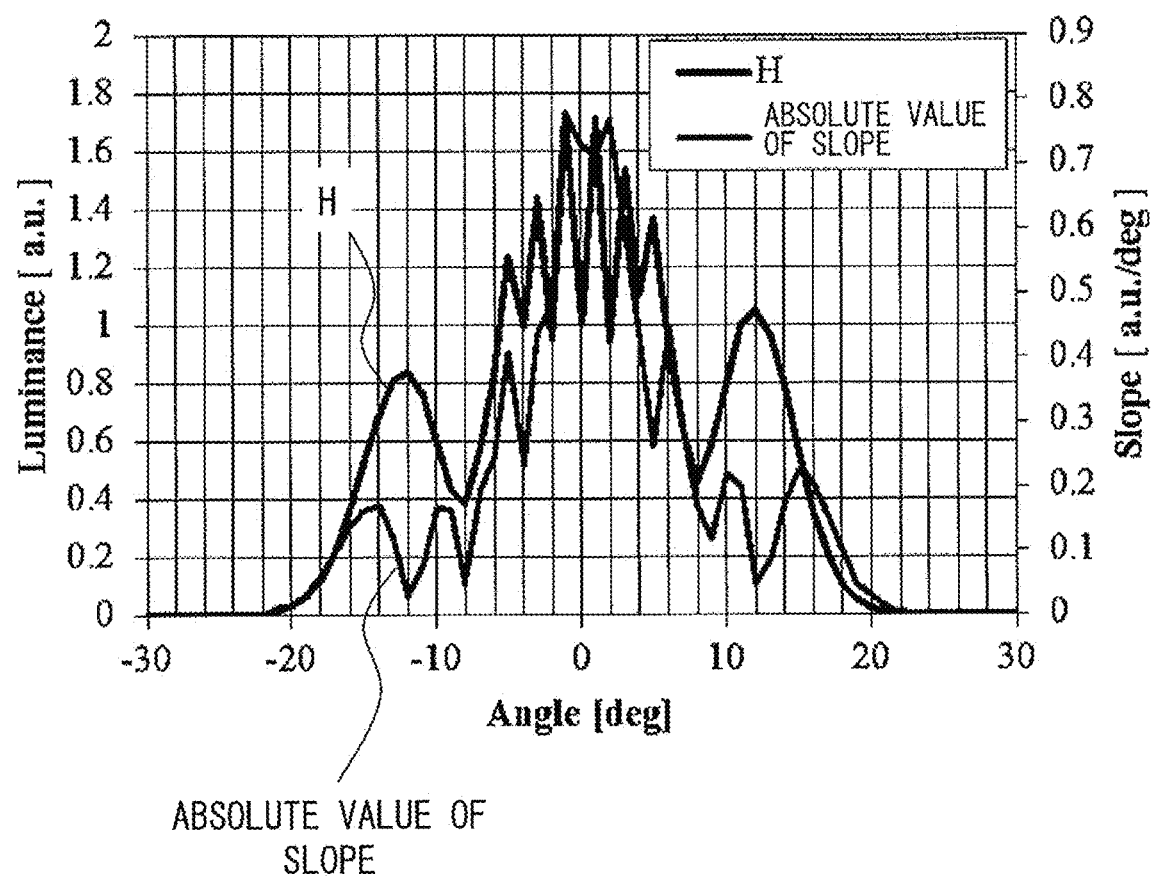
FIG. 12 is a diagram showing a diffusion angle distribution of a diffuser plate according to a comparative example 1 and an absolute value of a slope thereof.

The diffusion property of the diffuser plate molded using the stamper is shown in FIG. 12. In the uniform microlens array, the above-described standard deviation Sk of the relative front luminance is 0. However, in the microlens array in which the identical microlenses are repeated, it can be seen that the diffraction spot creates large unevenness in the diffusion property. Therefore, as the microlens array composed of the identical microlenses has large luminance unevenness, it is difficult to use it as a diffuser plate.

Next, a stamper having a microlens array provided with raised parts in the microlenses, which is disclosed in Patent Literature 4, was manufactured. The shape and arrangement of the microlenses were the same as those shown in FIG. 12. Since the microlens array was raised by the raised parts, the standard deviation Sk of each microlens was 0 in this microlens array.

Figure 13:
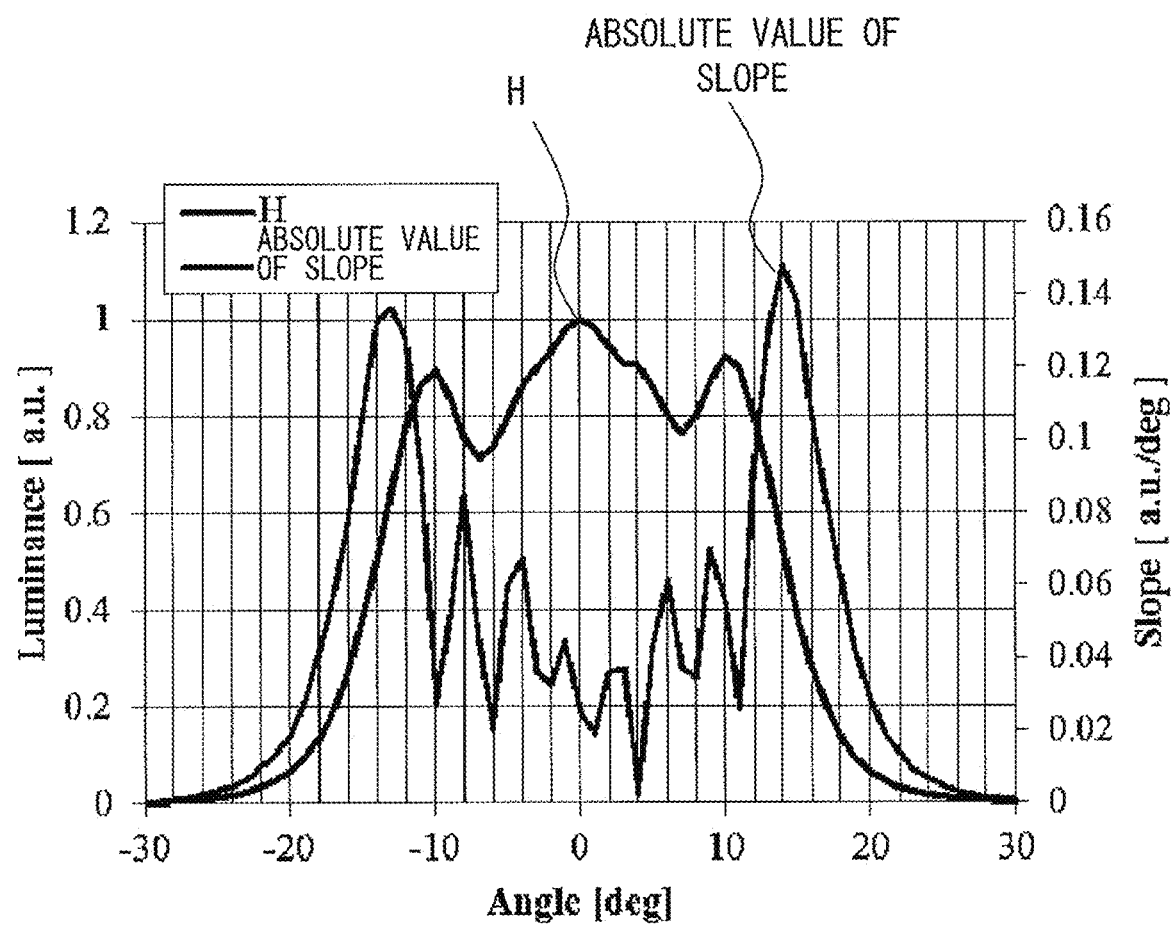
FIG. 13 is a diagram showing a diffusion angle distribution of a diffuser plate according to a comparative example 2 and an absolute value of a slope thereof.

FIG. 13 shows the diffusion property of the diffuser plate manufactured from this stamper. As compared with the microlens array composed of the identical microlens in FIG. 12, uneven luminance caused the diffraction spot was reduced. However, regarding the uniformity of the diffusion property, the average value of the absolute values of the slopes of the diffusion property was 0.042 [a.u./deg], and the maximum value of the slope of the diffusion property was 0.084 [a.u./deg]. Thus, the diffusion property of this microlens array was not uniform, and the microlens array cannot be used as a diffuser plate.

Note that the present disclosure is not limited to the above embodiments, and various modifications can be made without departing from the scope thereof. For example, the microlenses 2 arranged on the diffuser plate 1 are not limited to transmissive lenses. A light diffusion pattern having a concavo-convex shape similar to that of the microlenses 2 may be formed on the main surface S1 of the reflective diffuser plate 1 in a lattice like the microlens 2.

Alternatively, instead of the plurality of microlenses 2, a plurality of fine structures having a lens function may be arranged on the diffuser plate 1. The fine structures each having a lens function may be, for example, one that refracts light by a refractive index distribution formed by fine structures of subwavelength.

The present application is based upon and claims the benefit of priority from Japanese Patent Application No. 2015-049208, filed on Mar. 12, 2015, the entire contents of which are hereby incorporated by reference.

REFERENCE SIGNS LIST

1 DIFFUSER PLATE
2 MICROLENS
3 REFERENCE MICROLENS
4 PHASE MODULATION SHAPE

The invention claimed is:

1. A diffuser plate, comprising:
a microlens array comprising a plurality of microlenses 1 to n having two or more types of lens functions arranged on a main surface of a substrate,
wherein
the microlens array covers an area having a front side, a rear side, a left side, and a right side each of which are coincident with the directionality of the diffuser plate,
intensity of diffused light within a target diffusion angle range is substantially uniform,
the diffuser plate satisfies a relation of P×P×Sk≤400 [μm²], where P is an average pitch of the plurality of microlenses, Sk is a standard deviation of relative front luminances of microlenses 1 to n in the microlens array, and 0<P≤200 [μm], and Sk≥0.005, the shapes of the plurality of microlenses of the microlens array are a combination of a phase modulation shape and shapes of a plurality of reference microlenses,
the shapes of the plurality of reference microlenses are microlenses each having a symmetric axis, and
the phase modulation shape is a continuously changing three-dimensional curved surface without a symmetric axis.

2. The diffuser plate according to claim 1, wherein a diffusion profile of a diffusion property normalized by a luminance value in a front direction for a range of diffusion angles;
the diffusion profile comprising:
a first angular range spanning between angles at which intensity of diffused light becomes half of a maximum value in the diffusion profile;
a second angular range spanning is the wider of i) or ii):
i) between angles at which an absolute value of a slope of the diffusion property first becomes 0.02 [a.u./deg] or less, or
ii) between angles at which the absolute value of the slope of the diffusion property first becomes a local minimum point; and
wherein the second angular range comprises:
a maximum value of the absolute value of the slope of the diffusion property is 0.08 [a.u./deg] or less, and
an average value of the absolute value of the slope of the diffusion property is 0.04 [a.u./deg] or less.

3. The diffuser plate according to claim 1, wherein the plurality of microlenses, and shapes of bottom surfaces of the microlenses are polygons.

4. The diffuser plate according to claim 1, wherein the plurality of microlenses, shapes of bottom surfaces of the microlenses are rectangles or hexagons, and the microlenses are periodically arranged.

5. The diffuser plate according to claim 1, wherein
the diffuser plate is a transmissive diffuser plate,
the plurality of microlenses are of convex shapes, and
the diffuser plate satisfies a relation of $$0.2 \leq \Delta H \times (n-1) \times 1000/\lambda$$

where ΔH [μm] is a difference between a maximum height and a minimum height of the convex shapes of the plurality of microlenses from the main surface to vertexes of the plurality of microlenses, n is a refractive index of the microlens, and λ [nm] is a wavelength of incident light.

6. The diffuser plate according to claim 5, wherein
a plurality of microlenses are arranged on the main surface of the substrate,
shapes of cross sections of the plurality of microlenses perpendicular to the main surface differ from each other and do not have a symmetric axis, and
the diffuser plate satisfies a relation of P×P×Sk≤400 [μm²] where P is an average pitch of the plurality of microlenses, Sk is a standard deviation of relative luminance of the plurality of microlenses in their front directions, and 0<P≤200 [μm], and Sk≥0.005.

7. The diffuser plate according to claim 1, wherein
the diffuser plate is a transmissive diffuser plate,
the plurality of microlenses are of concave shapes, and
the diffuser plate satisfies a relation of $$0.2 \leq \Delta D \times (n-1) \times 1000/\lambda,$$

where ΔD [μm] is a difference between a maximum depth and a minimum depth of the concave shapes of the plurality of microlenses from the main surface, n is a refractive index of the microlens, and $\lambda$ [nm] is a wavelength of incident light.

8. The diffuser plate according to claim 1, wherein
the diffuser plate is a reflective diffuser plate,
the plurality of microlenses are of convex shapes, and
the diffuser plate satisfies a relation of $$0.1 \leq \Delta H \times 1000/\lambda$$

where $\Delta H$ [μm] is a difference between a maximum height and a minimum height of the convex shapes of the plurality of microlenses from the main surface to vertexes of the plurality of microlenses, and $\lambda$ [nm] is a wavelength of incident light.

9. The diffuser plate according to claim 1, wherein
the diffuser plate is a reflective diffuser plate,
the plurality of microlenses are of concave shapes, and
the diffuser plate satisfies a relation of $$0.1 \leq \Delta D \times 1000/\lambda$$

where $\Delta D$ [μm] is a difference between a maximum depth and a minimum depth of the plurality of microlenses from the main surface, and $\lambda$ [nm] is a wavelength of incident light.

10. The diffuser plate according to claim 1, wherein said diffuser plate comprises at least two microlens arrays.

11. The diffuser plate according to claim 1, wherein said diffuser plate comprises microlens arrays placed on both sides of the substrate.

12. The diffuser plate according to claim 11, further comprising a protective layer.

\* \* \* \* \*